United States Patent
Feyisetan

(10) Patent No.: US 11,538,467 B1
(45) Date of Patent: Dec. 27, 2022

(54) CALIBRATED NOISE FOR TEXT MODIFICATION

(71) Applicant: Amazon Technologies, Inc., Seattle, WA (US)

(72) Inventor: Oluwaseyi Oluwafemi Feyisetan, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 140 days.

(21) Appl. No.: 16/900,283

(22) Filed: Jun. 12, 2020

(51) Int. Cl.
*G10L 15/18* (2013.01)

(52) U.S. Cl.
CPC ............................ *G10L 15/1815* (2013.01)

(58) Field of Classification Search
CPC ..... G10L 15/1815; G10L 15/26; G06F 40/20; G06F 40/253; G06F 40/279; G06F 40/30
See application file for complete search history.

(56) References Cited

U.S. PATENT DOCUMENTS

| | | | | |
|---|---|---|---|---|
| 2006/0235661 A1* | 10/2006 | Price | ...................... | G06F 40/30 703/2 |
| 2014/0207442 A1* | 7/2014 | Ganong, III | ............ | G10L 15/30 704/201 |
| 2020/0335095 A1* | 10/2020 | Yuan | ...................... | G10L 15/22 |

OTHER PUBLICATIONS

Feyisetan, Oluwaseyi, et al. "Privacy-and utility-preserving textual analysis via calibrated multivariate perturbations." Proceedings of the 13th International Conference on Web Search and Data Mining. 2020.*

Feyisetan, Oluwaseyi, Tom Diethe, and Thomas Drake. "Leveraging hierarchical representations for preserving privacy and utility in text." 2019 IEEE International Conference on Data Mining (ICDM). IEEE, 2019.*

Fernandes, Natasha, Mark Dras, and Annabelle McIver. "Author obfuscation using generalised differential privacy." arXiv preprint arXiv:1805.08866 (2018).*

Fernandes, Natasha, Mark Dras, and Annabelle McIver. "Generalised differential privacy for text document processing." International Conference on Principles of Security and Trust. Springer, Cham, 2019.*

Dwork, Cynthia, et al. "Calibrating noise to sensitivity in private data analysis." Theory of cryptography conference. Springer, Berlin, Heidelberg, 2006.*

(Continued)

*Primary Examiner* — Paras D Shah
(74) *Attorney, Agent, or Firm* — K&L Gates LLP

(57) ABSTRACT

Devices and techniques are generally described for calibrating noise for natural language data modification. In various examples, first data representing a natural language input may be identified. A first vector representation of a first word of the first data may be determined. Sensitivity data may be determined for the first vector representation based at least in part on a first density of one or more vector representations adjacent to the first vector representation in an embedding space. In some examples, a first noise vector may be determined based at least in part on the sensitivity data. A first modified vector representation may be generated by adding the first noise vector to the first vector representation. A second word may be determined based at least in part on the first modified vector representation. Modified first data may be generated by replacing the first word with the second word.

20 Claims, 9 Drawing Sheets

(56) References Cited

OTHER PUBLICATIONS

Dwork, Cynthia, et al. "Calibrating noise to sensitivity in private data analysis." Journal of Privacy and Confidentiality 7.3 (2016): 17-51.*

Sadat et al.; A Privacy-preserving Distributed Filtering Framework for NLP Artifacts; BMC Medical Informatics and Decision Making; Sep. 7, 2019; 10 pgs.

* cited by examiner

CALIBRATED NOISE FOR TEXT MODIFICATION

BACKGROUND

Automatic speech recognition (ASR) combined with language processing techniques may enable a computing device to retrieve and process commands from a user based on the user's spoken commands. Natural language processing can be used to translate spoken and/or text requests into semantic interpretations of the input request. Executable instructions are generated based on the semantic interpretation of the spoken command. The executable instructions are executed and a corresponding task is performed. Such speech processing and voice control may be used by personal computers, hand-held devices, telephone computer systems, and a wide variety of other computing devices to improve human-computer interactions and to control various systems.

DETAILED DESCRIPTION

Figure 1:
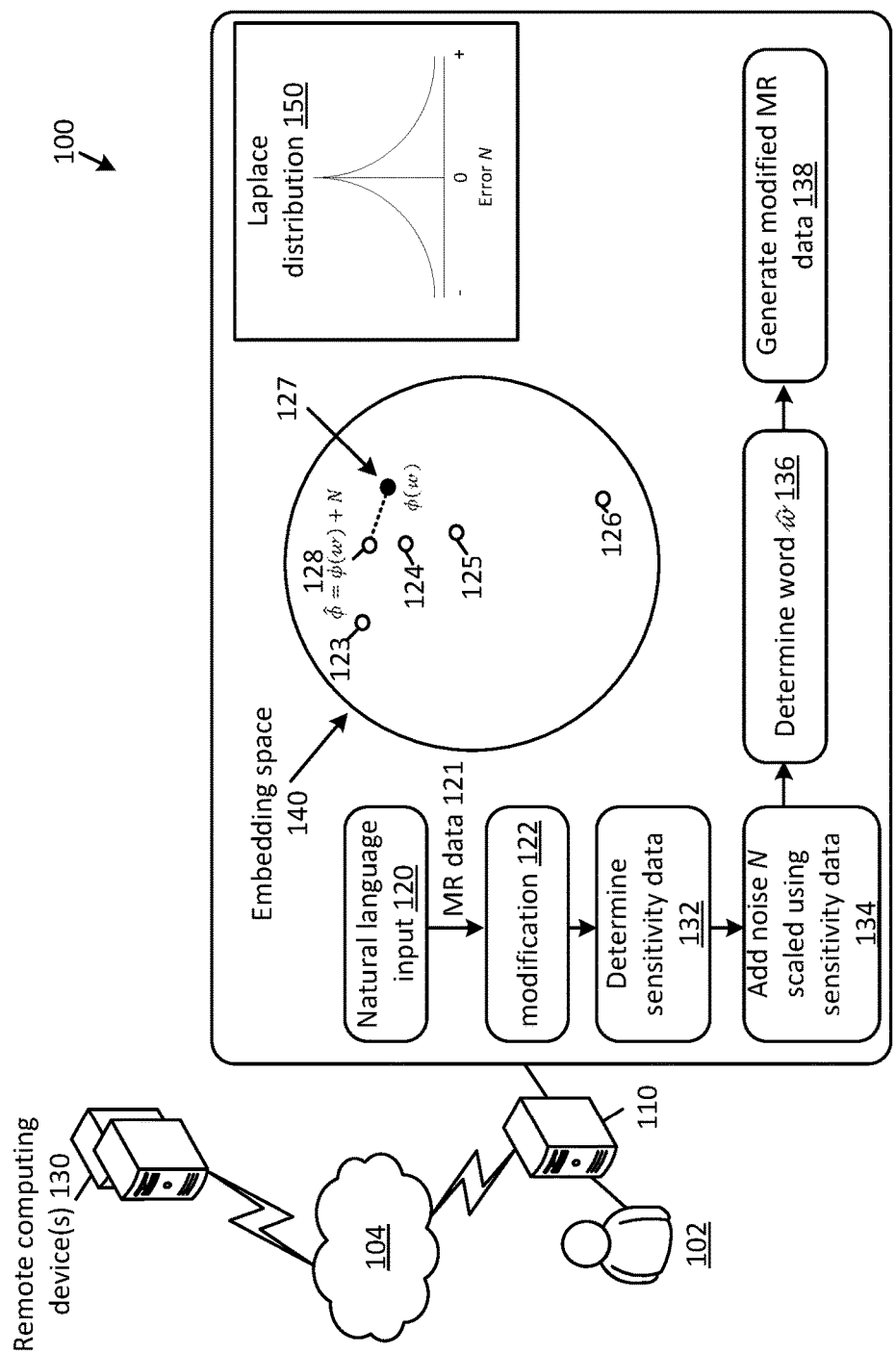
FIG. 1 is a diagram of a system configured to modulate modification of natural language input, according to various embodiments of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Spoken language understanding (SLU) is a field of computer science, artificial intelligence, and/or linguistics that receives spoken language as an input, interprets the input, and generates executable commands that may be executed by one or more other computing devices and/or speech processing components. SLU may include automatic speech recognition (ASR) and natural language understanding (NLU). ASR is a field of computer science, artificial intelligence, and linguistics concerned with transforming audio data associated with speech into text data and/or other ASR output data representative of that speech. NLU is a field of computer science, artificial intelligence, and linguistics concerned with enabling computers to derive meaning from text input containing natural language, resulting in specific semantic intent data representing a semantic interpretation of the text. The semantic intent data associated with a natural language input may include executable commands or other type of instructions that may be used to generate various types of output. For example, the semantic intent data may be processed to answer a question represented by the natural language input, take an action requested by the natural language input, answer a question represented by the natural language input, etc.

In various examples, spoken language understanding may be a combination of ASR systems and NLU systems, while in other examples, spoken language understanding may be a single model or other type of component effective to perform the functions of both ASR and NLU or otherwise take audio data as an input and output executable commands or other types of instructions representing the meaning of the audio data. In various further examples, SLU may include Text-to-speech (TTS) where a machine learning model may receive input audio data (e.g., request data representing user request data and/or user text input data) and may generate output audio data in response to the utterance. TTS is a field of computer science, artificial intelligence, and linguistics concerned with enabling computers to output synthesized speech. ASR, NLU, and TTS may be used together as part of a natural language processing system. In some examples, other types of input apart from spoken utterances may be received by a natural language processing system. For example, text, visual input (e.g., facial recognition and/or hand recognition), haptic input, and/or other types of input may be received and/or processed by a natural language processing system.

As used herein, user utterances, input text data, and/or any form of data input to a natural language processing system may be described as "natural language inputs" and/or "natural language input data." Data representing natural language inputs may change forms many times during processing of the request data by various components of the natural language processing system. For example, initially the request data may be audio data and/or input text data representing a user question. The audio data may be transformed into text data and/or other ASR output data by an ASR component of the natural language processing system. The text data and/or other ASR output data may be transformed into intent data by an NLU component of the natural language processing system. The intent data may be used by a speech processing application (e.g., a skill) to perform an action (e.g., to generate action data and/or other skill output that may be processed in order to take some corresponding action such as answering a user's question, playing video, playing audio, etc.).

In an example, text data and/or audio data representing questions and/or commands (e.g., natural language inputs) that may be processed using SLU may be sent to human annotators that may label the natural language inputs with one or more class labels. Such labels are annotations used by some machine learning models to "learn" to make better decisions. Accordingly, described herein are techniques that may be used to modify text representing a natural language input in order to reduce the risk that potentially sensitive information can be inferred using the text.

ε-differential privacy is a mathematical definition for the privacy loss associated with any data released from a statistical database. Differential privacy generally refers to techniques for sharing information about a particular dataset by describing patterns of groups within the dataset while withholding information about individuals in the dataset. Since differential privacy is a probabilistic concept, any differentially private mechanism is necessarily randomized. Some of these, like the Laplace mechanism, add controlled noise to the desired function. In differential privacy, the goal is to give each individual roughly the same privacy that would result from having that individual's data removed. That is, the statistical functions run on the database should not overly depend on the data of any one individual.

In various examples described herein, words present in a textual representation (or other meaning representation data representing natural language) of a natural language input may be replaced by another word while attempting to maintain semantic fidelity of the natural language input. Replacing the word may be accomplished by modifying a vector representation of the current word to generate a "perturbed" vector representation in an embedding space. The closest vector representation in the embedding space to the perturbed vector representation may be selected as the word to replace the current word. The Laplace mechanism may be used to sample noise from a Laplace distribution to determine noise to add to (or subtract from, or otherwise modify) a word's vector representation. As described in further detail below, in differential privacy, the parameter ε scales the amount of noise that is added to a particular word of a natural language input. Generally, lower values of the parameter c may result in increased noise added and decreased utility (e.g., decreased semantic fidelity), while higher values of the parameter e may result in decreased noise added and increased utility (e.g., increased semantic fidelity relative to a higher amount of added noise). Accordingly, the parameter ε may be selected for a particular implementation in order to balance the amount of privacy-preserving noise used to modify natural language inputs with the utility of the resulting phrase to the specific use-case (e.g., training a natural language machine learning model).

Described herein are techniques that may be used to calibrate added noise to a smooth sensitivity of words neighboring the current word to be noised. As a result of such techniques, the noise added for a particular word is a function of the current word's neighboring density (in the embedding space), as opposed to the worst-case requirements of standard differential privacy in which the sensitivity is set to a global value based on rare words in the vocabulary.

Additionally, shuffling techniques are described that may be used to reduce the risk that a particular source of natural language data may be inferred.

FIG. 1 is a diagram of a system 100 configured to modify a natural language input 120 using calibrated noise. In the examples described herein, a noise vector N that is of the same dimensionality as a vector representation of the natural language data (e.g., natural language input 120) may be used to modify the natural language data to generate modified meaning representation data 138, according to various embodiments of the present disclosure. The modified meaning representation data 138 may be natural language data (e.g., triple data, text data, audio data representing speech, etc.) that is semantically similar to the natural language input 120. Similarly, natural language input 120 may be natural language data that may be represented as meaning representation data 121. Natural language data may comprise any kind of meaning representation including, without limitation, text, audio representing speech, triple data (and/or other structured meaning representations), etc. Generally, natural language data (e.g., natural language input 120, meaning representation data 121, modified meaning representation data 138, etc.) may represent one or more words of a spoken language.

In various examples, a user 102 may communicate with a local device 110. Local device 110 may be a speech-processing enabled device and may be effective to continually "listen" for a wake word. Upon detection of a wake word, local device 110 may record and may perform ASR to determine text data representing a natural language input represented by the audio. In some examples, instead of receiving audio, local device 110 may receive other inputs such as text inputs and/or graphical user interface inputs (e.g., via a mouse, touchscreen, etc.). In any event, user 102 may input a natural language input 120 into local device 110. The natural language input 120 may be data that may represent one or more words. In an example, the natural language input 120 may be audio data that is transformed into text data via ASR. In another example, the natural language input 120 may be text data comprising one or more words (sometimes referred to as "tokens"). Natural language input 120 may be represented as meaning representation (MR) data 121, as previously described.

In an example, local device 110 may be configured in communication with one or more remote computing device(s) 130 over a network 104. Network 104 may be a wide area network (WAN), such as the Internet, or may be a local area network (LAN). In various examples, the remote computing device(s) 130 may be configured to perform the various techniques described herein related to generation of modified meaning representation data 138 for a given natural language input 120. In other examples, local device 110 may be configured to perform the various techniques described herein related to generation of modified meaning representation data 138 for a given natural language input 120 prior to sending the modified meaning representation data 138 to one or more remote computing device(s) 130 to mitigate the risk of divulging any sensitive information.

In various examples, meaning representation data may be selected for modification (block 122) from among the natural language input 120. For example, if the natural language input 120 is audio representing a user request. ASR may be performed to generate meaning representation data representing the user request. Thereafter, one or more words of the meaning representation data may be selected for modification (block 122) using the various techniques described herein. In another example, the natural language input 120 may be received by system 100 as meaning representation data. In such an example, one or more words may be selected for modification from the input meaning representation data.

In some examples, words selected for modification may be words of the natural language data that are classified as potentially sensitive, for example, using differentially private explorations trees or n-grams. For example, tokens with frequency counts above a threshold may be classified as having a low likelihood of being sensitive or not being sensitive. For example, commonly used words such as "the," "or," or "order" may be given a classification that is indicative of not being sensitive. Other words of the utterance may be given a classification of being potentially sensitive. The classifications may be binary. In some implementations, a sensitivity score may be determined for a word in an utterance. For example, a social security number may be given a relatively high sensitivity score, a place name (e.g., "Tuscon") may be given a medium sensitivity score, and the term "the" may be given a relatively low sensitivity score. In such implementations, a threshold score may be determined and words below the threshold may be categorized as not being sensitive and words above the threshold may be categorized as potentially sensitive. A replacement word for a potentially sensitive word may be obtained by adding calibrated noise, as described herein. In general, the manner of selection of the particular words to be noised using the various techniques described herein may be an implementation detail and any selection technique(s) may be used in accordance with the present disclosure.

Upon selection of a word w in the meaning representation data, a vector representation of the word $\phi(w)$ may be determined in an embedding space 140. For example, vector representation 127 may represent a multi-dimensional vector representing a word in the natural language input 120 (e.g., a word of the meaning representation data 121 representing the natural language input 120) to be modified. The vector representation 127 may be surrounded in the embedding space 140 by a number of different vector representations 123, 124, 125, 126, etc., where each of these other vector representations is associated with a respective word of the corpus. The distance (e.g., the Euclidean distance) between any two vector representations in the embedding space 140 may represent a semantic difference between the two words. Accordingly, the smaller the distance between two vector representations, the more similar the semantic meanings of the words associated with the two vector representations. As such, vector representations of the words "easy" and "simple" may be close together in the embedding space, whereas vector representations of the words "zoo" and "tomato" may be relatively far apart.

As described in further detail below, in differential privacy, the amount of noise N used to perturb a vector representation of a word may be a function of the parameter ε as well as of the sensitivity of the noise-adding function (e.g., a randomization function R). In some example implementations of differential privacy, global sensitivity may be used to scale the amount of noise added. Global sensitivity may be determined based on the distance in the embedding space 140 between a vector representation of a current word and the vector representation of the word that is farthest away in the embedding space 140. However, using global sensitivity to scale added noise may result in modified meaning representation data that does not maintain a high degree of semantic fidelity with the natural language input 120, especially when modifying common and/or densely-represented words in the embedding space. This is because, in such a scenario, noise is added based on the "worst case scenario" rare words to ensure that the added noise is sufficient to modify such rare words.

Instead, in the various techniques described herein, local sensitivity data may be determined for each word to be modified (block 132). As described in further detail below, the local sensitivity is a function of the density of k neighboring words (e.g., vector representations of words) in the embedding space 140 relative to the current word. The local sensitivity acts as an outer bound of the amount of noise N that may be sampled from the Laplace distribution 150 and added to the vector representation of the current word to generate modified meaning representation data 138. In at least some examples herein, the local sensitivity may be referred to as "sensitivity," for brevity.

However, for rare words, the sensitivity may still allow for information to be inferred from the output word ŵ (the modified word used to replace the current word). This is because, for rare words, the same word may be used to replace the input word in a majority of cases, as the local sensitivity may encompass only one (or a few) other data points. Accordingly, to introduce an added layer of randomization, a smooth upper bound that may further limit the local sensitivity may be generated by multiplying (or otherwise modifying) the local sensitivity by an exponential term including a parameter β, as described in further detail below.

After determining the sensitivity data (block 132) (e.g., the local sensitivity, whether smoothed using the parameter β or not) noise may be determined at block 134. The local sensitivity may be used to bound the amount of noise N (e.g., to limit the magnitude of the noise N) that is sampled from the Laplace distribution 150. The Laplace distribution 150 is discussed in further detail below. The noise may be added by adding the noise vector N to the vector representation of word to be modified $\phi(w)$ to generate a perturbed vector $\hat{\phi}$. At block 136, a word ŵ that corresponds to the perturbed vector is determined. For example, the closest vector representation (e.g., the closest data point of the corpus) in the embedding space 140 to the perturbed vector $\hat{\phi}$ may be determined. In the example depicted in FIG. 1, the vector representation 124 is the closest vector representation to the perturbed vector 128. Accordingly, the word represented by vector representation 124 may be the word ŵ determined at block 136. At block 138, modified meaning representation data may be generated by replacing the current word being evaluated (e.g., the word of natural language input 120 represented by vector representation 127) with the word w determined at block 136.

As described herein, differential privacy techniques may be adapted for meaning representation data by adding noise to the vector representation of words in a high dimensional embedding space 140, and projecting the noisy vectors back to the discrete vocabulary space.

Consider a set of n users, each with data $x_i \in \mathcal{X}$. Each user releases up to m messages using differential privacy while maximizing the utility gained from the release of the messages. One approach is for each user to submit their messages $(x_{i,1}, \ldots, x_{i,m})$ in clear form to a trusted curator. The curator then proceeds to apply a privacy preserving randomized mechanism $\mathcal{R}(*)$ to the analysis $\mathcal{A}(x)$ on the aggregated data. The privacy mechanism works by injecting noise to the results of the analysis. This technique presupposes that the users trust the curator.

Another theoretical approach is for each user to apply the encoding or randomizing mechanism R: $X \rightarrow \mathcal{Y}^m$ to their own data, locally. The resulting n • m messages $(y_{i,1}, \ldots, y_{i,m}) = R(x_i)$ for each user are then passed to the curator for analysis $\mathcal{A}: \mathcal{Y}^* \rightarrow \mathcal{Z}$. Such a model provides stronger privacy guarantees in the presence of an untrusted curator. However, it incurs more error than the curator model because it requires multiple local $R(x_i)$ transformations (as opposed to a single transformation by the trusted curator). The local model may be more amenable for text as users may prevent sensitive information from being inferred on the basis of individual user requests, commands, etc.

The error accrued in the local model may be exacerbated by the output range of the randomization function $R(x_i)$. For example, for one-bit messages (e.g., a coin flip) where $f: \mathcal{X} \to [0, 1]$, the overall error decreases more rapidly as the number of users increase, given the small output size of 2. However, as the number of outputs increase (e.g., a die roll with 6 outputs), the noise smooths out more slowly. However, for analysis over vector representations of words $f: X \to \mathbb{R}^d$ where d is the dimensionality of a word embedding model, and the number of words in the vocabulary could exceed hundreds of thousands, the resulting analysis leads to far more noisy outputs. The noise (and by extension, the error) increases because of the differential privacy promise—e.g., to guarantee privacy and protect all outliers, there must be a non-zero probability for transforming any given word x to any other word x' in the dataset. The size of such an output space may be loosely correlated with the sensitivity of the function $f$. Therefore, when the sensitivity is large, more noise is required to preserve privacy.

One way to reduce the error is to limit the number of contributions m from each of the n users, thereby putting a bound on the amount of noise. However, capping user contributions introduces bias into the data (by equating large-volume users with large submissions, to small-volume users with a few contributions). In the various embodiments described herein, it is assumed that all users submit the same number of data points, and the techniques are designed to scale the noise associated with the sensitivity over each datum (and not the number of user contributions). Therefore, another way to reduce the error may be to reduce the magnitude of the noise. This approach theoretically leads to weakened privacy guarantees. However, it could be a practical solution for some empirical cases where the typical sensitivity is less than the theoretical sensitivity. For example, the theoretical sensitivity for computing the median of an arbitrary set of numbers is infinite, but, in most dataset scenarios, the sensitivity is smaller as values coalesce around the median.

Definitions

Let $x \in X^n$ be a collection of datasets from users. The Hamming distance $d_H(x, x')$ between two datasets is the number of entries on which x and x' differ i.e.

$$d_H(x, x') = |\{i : x_i \neq x'_i\}| = \sum_{i=1}^{|X|} |x - x'|.$$

Two datasets $x, x' \in X$ are adjacent (we denote this as x~x') if $d_H(x, x')=1$ Definition 0.1 A randomized algorithm $\mathcal{A}: X^n \to \mathcal{Z}$ is ε-differentially private if for every adjacent dataset x~x' ∈ $X^n$ and every $\mathcal{Z} \subseteq$ Range ($\mathcal{A}$), Pr[ $\mathcal{A}(x) \in \mathcal{Z}$ ] ≤ $e^\varepsilon$ Pr[ $\mathcal{A}(x') \in \mathcal{Z}$ ].

A differential privacy (DP) algorithm protects a user by ensuring that its output distribution is approximately the same whether or not the user was in the dataset used as an input to the algorithm. DP is usually achieved by applying noise drawn from a Laplace distribution scaled by the sensitivity $\Delta_f$ of the analysis function $f$.

Definition 0.2 The $L_1$ global sensitivity of a function $f: x^n \to \mathbb{R}^d$ is the smallest number that for x~x' ∈ X, $$\Delta_{G_f} = \max_{x,x': d(x,x')=1} \|f(x) - f(x')\|_1$$

where $d(x, x')=\|x-x'\|_1=1$ is the Hamming distance between adjacent datasets. The sensitivity captures the uncertainty in the responses of the users (e.g., by how much can any user's response change the results of the analysis $f$). It therefore indicates how much noise is required to provide privacy for any contributing user. As discussed earlier, the global sensitivity can be very high to satisfy theoretical guarantees for any adjacent datasets. This is because the magnitude of the added noise depends only on the privacy parameter ε and the sensitivity $\Delta_{G_f}$, but not on the dataset X.

Definition 0.3 (Local sensitivity). The local sensitivity of a function $f: X^n \to \mathbb{R}^d$ is given for x~x' ∈ X as, $$\Delta_{\mathcal{L}_f} = \max_{x,x': d(x,x')=1} \|f(x) - f(x')\|_1$$

The local sensitivity of $f$ with respect to x is how much $f(x')$ can differ from $f(x)$ for any x' adjacent to the input x (and not any possible entry x). It may be observed from Definitions 0.2 and 0.3 that $\Delta_{G_f} = \max_x \Delta_{L_f}(x)$. However, a mechanism that adds noise scaled to the local sensitivity does not preserve DP as the noise magnitude can leak information. To address this, noise may be calibrated to a smooth bound on the local sensitivity.

Definition 0.4. Given the Laplace distribution (centered at 0) with scale λ, variance $2\lambda^2$, and probability density function $$Lap(x \mid \lambda) = \frac{1}{2\lambda} e^{-|x|/\lambda},$$

the algorithm $\mathcal{A}(\mathcal{X}) = f(X) + Lap(\Delta_{G_f}/\varepsilon)$ is ε-differentially private.

The DP guarantee from the Laplace mechanism is defined on adjacent datasets. However, not all adjacent datasets can be appropriately described using the Hamming distance. For example, given a dataset of geolocation coordinates (longitude and latitude) on a 2—d plane, the notion of adjacency could be better captured using the Euclidean distance between the coordinates. As a result, changing a coordinate x results in a change in $f(x)$ under the Euclidean distance measure over the function in 2—d metric space (e.g., $f(x)$ can be the distance from a point of interest to a home address). The sensitivity in this metric space is defined as follows:

Definition 0.5 (Global metric sensitivity). Given metric space $\mathcal{M}$ equipped with a distance function $d_M: X \times X \to \mathbb{R}_+$. The metric sensitivity $\Delta_{M_f}$ of a function $f: X^n \to M$ quantifies how much $f$ changes when an input to the function changes, given as $$\Delta_{M_f} = \sup_{x,x': d_H(x,x')=1} d_M(f(x), f(x'))$$

Given a distance function $d_M$ satisfying the axioms of a metric (e.g., non-negativity: $d_M(x, x) \geq 0$), identity of indiscernibles: $d_M(x, x)=0$, symmetry: $d_M(x, x')=d_M(x', x)$, and the triangle inequality: $d_M(x, x') \leq d_M(x, z) + d_M(z, x')$, the following generalized definition of differential privacy is obtained:

Definition 0.6 (Metric Differential Privacy). A randomized algorithm $\mathcal{A}: X^n \to P(\mathcal{Z})$ satisfies generalized differential privacy if $\forall x, x' \in X$ $$\mathcal{A}(x)(\mathcal{Z}) \le e^{\varepsilon d_M(x,x')} \mathcal{A}(x')(\mathcal{Z})$$

Several pieces of research have demonstrated generalized DP (also known as $d_x$ privacy) for different metric spaces and distance functions. However, the techniques described herein focus on preserving privacy in high dimensional metric spaces equipped with the Euclidean metric. To achieve this form of metric differential privacy ($d_x$ privacy), using a corollary to the Laplace mechanism, noise is sampled from an n—dimensional Laplacian and added to the output of the desired mechanism. The noise is controlled by the privacy parameter $\varepsilon$ and the metric sensitivity $\Delta \mathcal{M}_f$.

Definition 0.7 (Multivariate Laplace mechanism). Given the n—dimensional Laplacian $\text{Lap}_\varepsilon^n(x|\lambda)$ realized from a vector in the unit hypersphere $\mathbb{B}^n$ and magnitude sampled from the Gamma distribution $\text{Gam}_{1/\varepsilon}^n(x)$, the algorithm $\mathcal{A}(X) = f(X) + \eta$ is $d_x$ private. Where the privacy preserving noise $\eta \sim \text{Lap}_\varepsilon^n(x|\lambda)$ With the above definitions, various composite $d_x$-privacy embodiments of the present disclosure are described in detail below.

Randomizer

The randomizer $\mathcal{R}$ is based on the $d_x$ metric privacy mechanism used on word embeddings where the distance between word vectors is represented as the Euclidean metric. However, the distance metric may be represented using other metrics (e.g., the Earth mover distance). Similarly, the model may be extended to demonstrate preserving privacy using noise sampled from Hyperbolic space. As previously described, the metric space of interest is as defined by word embedding models which organize discrete words in a continuous space such that the similarity in the space reflects their semantic affinity. Models such as WORD2VEC, GLOVE, and FASTTEXT may be used to create a mapping $\phi: \mathcal{W} \to \mathbb{R}^d$, where the distance function is expressed as d: $\mathcal{W} \times \mathcal{W} \to \mathbb{R}_+$. The distance $d(w, w')$ between a pair of words is therefore given as $\|\phi(w) - \phi(w')\|$ where $\|\cdot\|$ is the Euclidean norm on $\mathbb{R}^d$.

The privacy mechanism $\mathcal{R}$ functions by computing the vector representation $\phi(w)$ of a word w in the embedding space, applying noise N calibrated to the global metric sensitivity $\Delta_{M_f}$ to obtain a perturbed vector $\hat{\phi} = \phi(w) + N$, and then swapping the word w with the word $\hat{w}$ with an embedding that is closest to $\hat{\phi}$. The noise is calibrated over the entire size vocabulary $|\mathcal{W}|$ such that there is a non-zero probability of transforming one word into any other word. The probability of the output distribution is scaled by the distance between the respective input words with larger probability mass concentrated closer to the word of interest.

However, the above mechanism may lead to sub-optimal accuracies due to a lack of uniformity in the embedding space. In particular, to achieve a certain level of privacy protection, the amount of noise is controlled by the worst-case word, which roughly corresponds to the word whose embedding is farther apart from any other word (e.g., the global sensitivity). Therefore, at a given level of $\varepsilon$, a unique word like nudiustertian will be perturbed similarly to a common word like happy which may have a large number of possible synonyms.

Calibrating Noise to Smooth Sensitivity

Consider two possible word vectors $\phi(w)$ and $\phi(w')$ in the embedding space equipped with a distance function d. A randomizer function $\mathcal{R}: \mathcal{W} \to W$ satisfies $\varepsilon d_x$-privacy if for any $w, w' \in W$ the distributions over outputs of $R(w)$ and $R(w')$ satisfy the following bound: for all $w \in W$:

$$\frac{Pr[\mathcal{R}(w) = \hat{w}]}{Pr[\mathcal{R}(w') = \hat{w}]} \le e^{\varepsilon d(w,w')}. \quad (1)$$

$\hat{w}$ may be calibrated at the worst-case distance T from w and w'. On the other hand, if $\hat{w}$ is considered at a distance $0 < t < T$, then the local sensitivity $\Delta_{L_f}$ of R is $$\Delta_{L_f}^{(t)}(w) = \max_{w':d(w,w') \le t} \Delta_{L_f}(w'). \quad (2)$$

However, for the rare word example w=nudiustertian, the local sensitivity might still leak information on output $\hat{w}$. As a result, $\Delta_{S_f}$ may be constructed as a $\beta$-smooth upper bound on the local sensitivity. The desired properties of the bound include that: (1) $\forall w \in W: \Delta_{S_f}(w) \ge \Delta_{L_f}(w)$ and (2) $\forall w, w' \in W$, $d(w, w') > 0: \Delta_{S_f}(w) \le e^{\beta} \cdot \Delta_{S_f}(w')$. The smooth bound is equal to the local sensitivity $\Delta_{G_f}$ when $\beta = 0$. Therefore, the smallest function $\Delta_{S_{f,\beta}}*$ that satisfies the two stated properties is the smooth sensitivity of the underlying function $f$ and can be stated as:

$$\Delta_{S_{f,\beta}^*}(w) = \max_{w':d(w,w') \le t} \left(\Delta_{L_f}(w') \cdot e^{-\beta d(w,w')}\right) \quad (3)$$

Local Sensitivity

The local sensitivity $\Delta_{L_f}^{(t)}$ can be replaced with another function $C^{(t)}(w)$ s.t. $\forall w, w' \in \mathcal{W}: C^{(t)}(w) \le C^{(t+\delta)}(w')$. $\Delta_{L_f}^{(t)}$ is determined by calculating the average distance between the current word w, and its k closest neighbors (rather than the max distance for $\Delta_{G_f}$):

$$t = \frac{1}{k} \sum_{i=1}^{k} \|\phi(w) - \phi(w_i)\| \quad (4)$$

Figure 2:
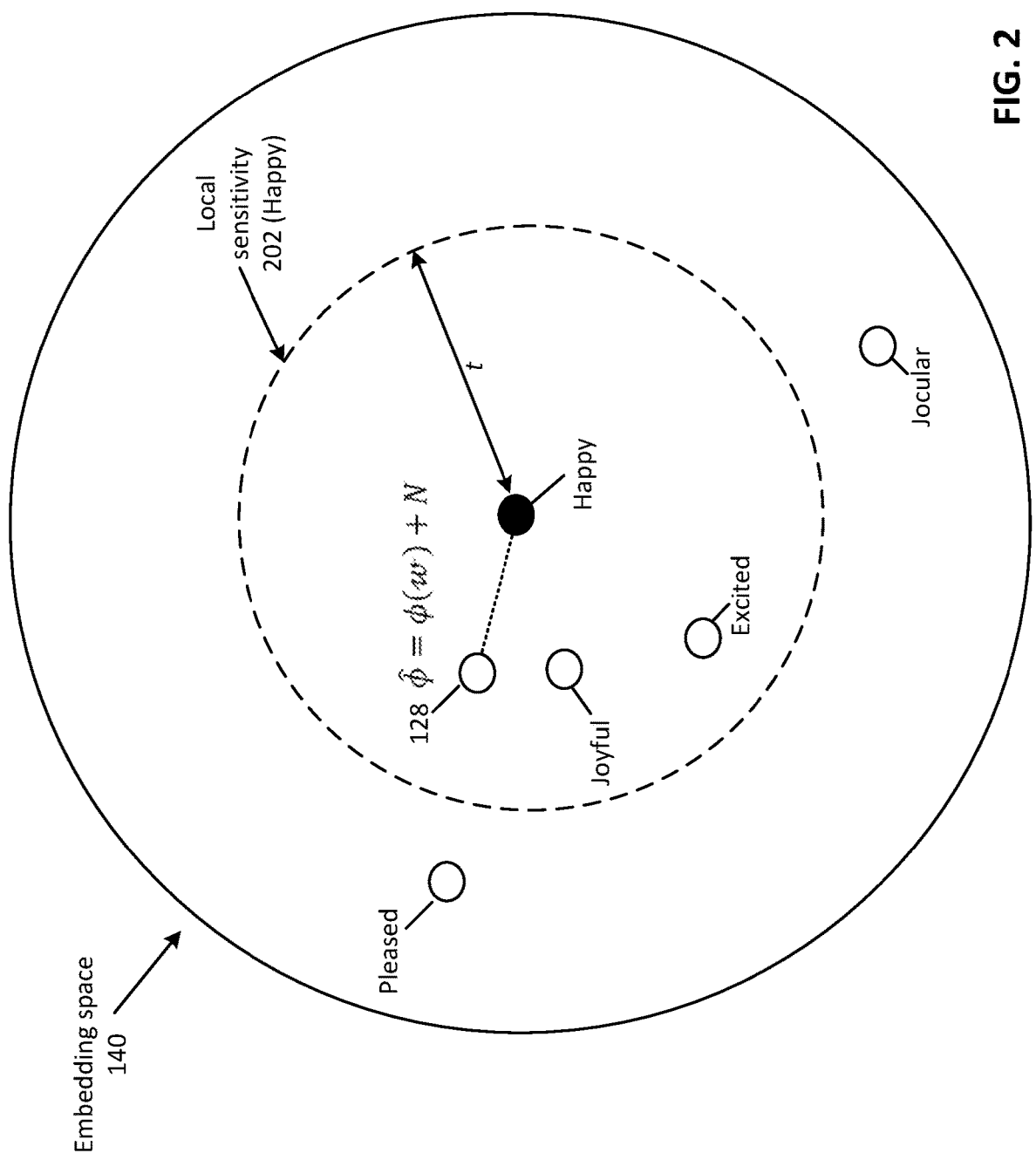
FIG. 2 depicts an example of a sensitivity data in an embedding space used to calibrate modification of natural language data, in accordance with various embodiments of the present disclosure.

FIG. 2 depicts an example of a local sensitivity 202 in an embedding space 140 used to calibrate noise for meaning representation data modification, in accordance with various embodiments of the present disclosure. In the example, the word "happy" may be among the words represented by a natural language input. The word "happy" may have been selected for modification using the various techniques described herein. Accordingly, a vector representation of "happy" ($\phi(w)$) may be determined. The black circle in FIG. 2 represents the vector representation of "happy" in embedding space 140. Thereafter, the local sensitivity may be determined using the vector representation of the word "happy." A value k may be selected for determining the local sensitivity. The value k controls the number of closest neighbors in embedding space 140 that are used to compute the local sensitivity. Thereafter, the average distance in the embedding space 140 between the vector representation for "happy" and the vector representations for the k nearest neighbors is determined. For example, for k=4, the nearest neighbors of "happy" may be the vector representations for the words "joyful," "excited," "pleased," and "jocular." The average distance may be determined between the vector representation of "happy" and each of the closest 4 nearest neighbors using equation (4), above. The average distance may be represented as the distance t which corresponds to the local sensitivity 202.

A smooth bound may be determined for local sensitivity 202 by sampling a random neighbor of the vector representation of happy (e.g., the vector representation ϕ($w$ ')). The distance between the vector representation of happy and the randomly sampled neighbor is determined (e.g., d($w$, $w$ ')). Thereafter, the smooth sensitivity may be determined using equation (3), after selection of the parameter β. The smooth sensitivity is used as an outer bound when sampling noise N from the Laplace distribution 150 (FIG. 1) using the Laplace mechanism.

Thereafter, a modified vector representation is determined for "happy" by adding the noise vector N to the vector representation of happy (e.g., $\hat{\phi}=\phi$($w$ )+N) to generate perturbed vector 128 (e.g., a modified vector representation). The nearest vector representation in embedding space 140 to the perturbed vector 128 may be determined. In the example depicted in FIG. 2, the vector representation of the word "joyful" may be the closest vector representation to perturbed vector 128. Accordingly, in the example modified meaning representation data (e.g., modified meaning representation data) may be generated by replacing the word "happy" with the word "joyful."

Figure 3:
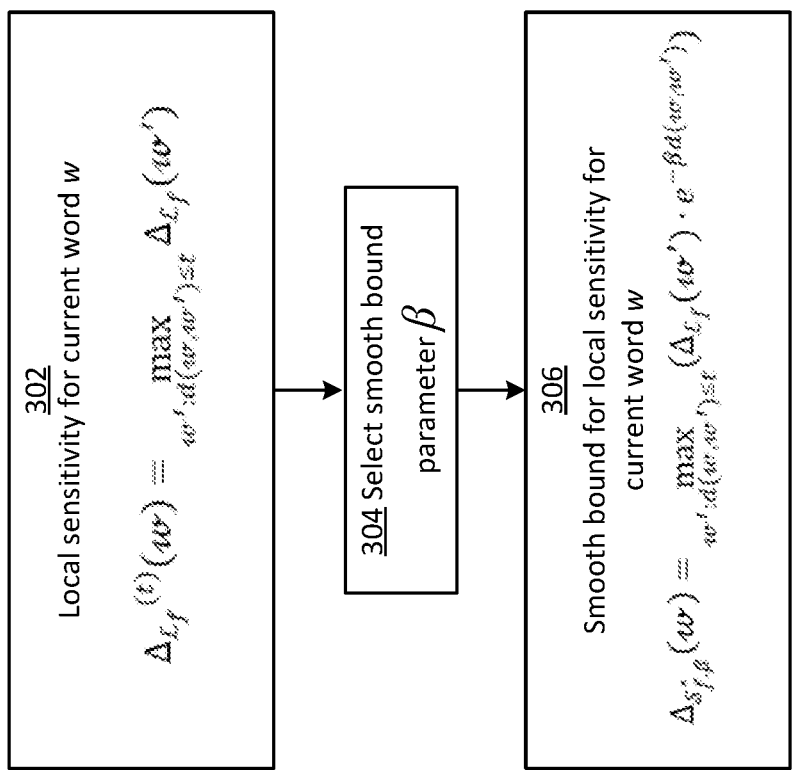
FIG. 3 depicts an example process for determining a smooth bound for sensitivity data for a current word w, in accordance with various aspects of the present disclosure.

FIG. 3 depicts an example process for determining a smooth bound 306 for local sensitivity for a current word w, in accordance with various aspects of the present disclosure. In various examples, the local sensitivity 302 may be determined for the current word w using equation (2) above. In the example provided by equation (4), the average distance between the current word w and the k nearest neighbors may represent the local sensitivity 302. Thereafter, a parameter β may be selected (block 304) and used to generate a β-smooth upper bound on the local sensitivity. As described above, the parameter β may be used to determine an exponential term as described in equation (3) above that may be used to modify the local sensitivity 302 for a randomly sampled word w'. The smoothing of the local sensitivity 302 may add an additional layer of randomization so that it is less likely that sensitive information may be inferred for rare words. For example, the local sensitivity for a rare word may always replace the rare word with the same word (or with one of a small number of words). Accordingly, smoothing the local sensitivity may randomize the noise added to the rare word such that the words used to replace the word are different over time.

Figure 4:
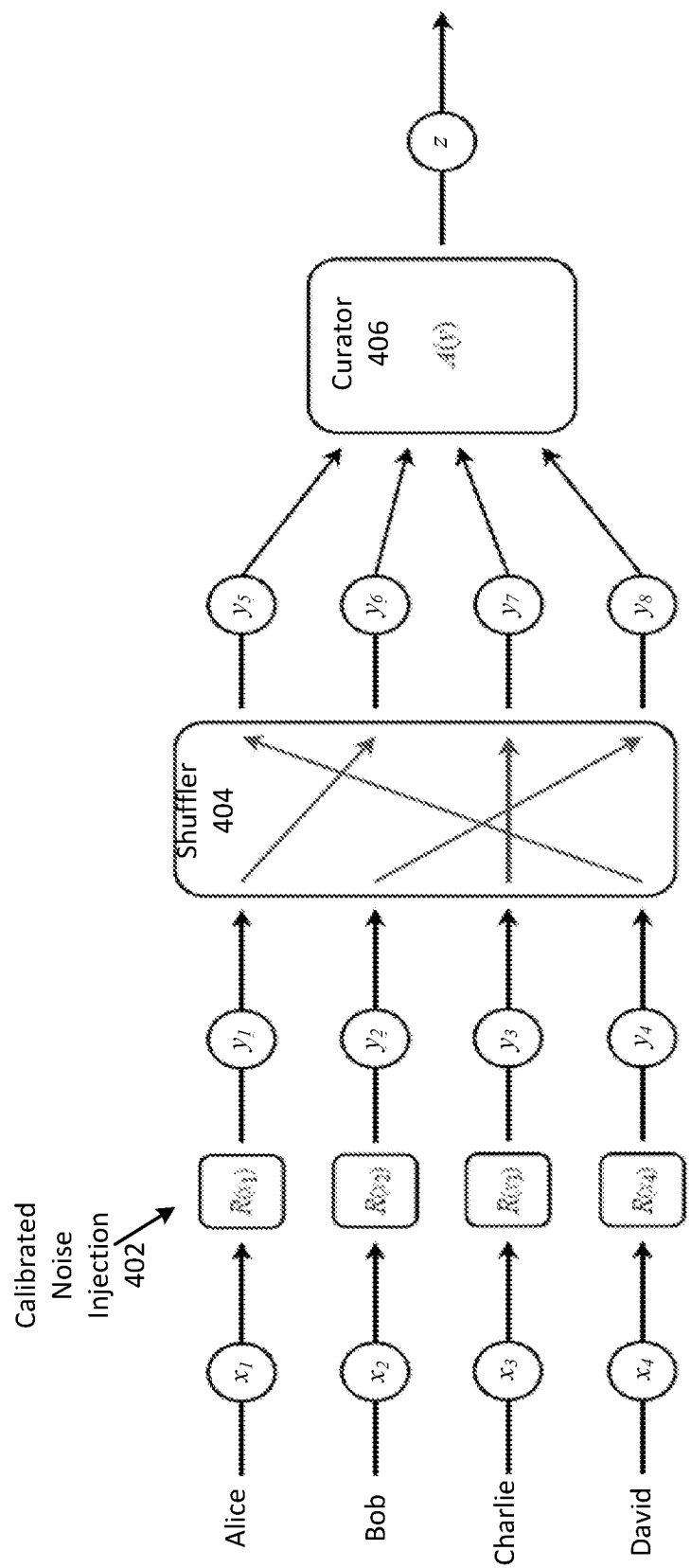
FIG. 4 depicts an example shuffling mechanism that may be used to reduce a source-identification risk for natural language data, in accordance with various aspects of the present disclosure.

FIG. 4 depicts an example shuffling mechanism that may be used to reduce a source-identification risk for meaning representation data, in accordance with various aspects of the present disclosure. As previously described, in various examples, natural language inputs received from users may be modified using the various techniques described herein on local user devices prior to sending the modified natural language inputs to one or more other devices and/or users (e.g., prior to sending the modified natural language inputs to remote computing device(s) 130 and/or to curator 406).

In the example depicted in FIG. 4, each user may generate a set of natural language inputs (e.g., meaning representation data queries). For example, Alice may generate natural language queries $x_1$ (which may represent, for example, 10 meaning representation data queries generated by Alice). Similarly, Bob may generate the set of natural language queries $X_2$, Charlie may generate the set $X_3$, and David may generate the set $X_4$. Calibrated noise injection 402 may modify the various natural language queries of each user locally using the randomization function R with the noise added calibrated as described herein to output the respective modified natural language queries $y_1$, $y_2$, $y_3$, and $y_4$. Each of the modified natural language queries $y_1$, $y_2$, $y_3$, and $y_4$ may represent, for example, the same 10 meaning representation data requests/commands as the queries, but with one or more words having been replaced by the calibrated noise injection 402, as described above. Additionally, as previously described, the calibrated noise injection 402 may be performed locally by each respective user's local device to reduce risk of privacy loss.

Instead of sending all 10 modified queries $y_1$ directly to a remote computing device (e.g., to curator 406), the queries may be shuffled by shuffler 404 to generate the shuffled sets of modified queries $y_5$, $y_6$, $y_7$, and $y_8$. The shuffled sets of modified queries $y_5$, $y_6$, $y_7$, and $y_8$ may each comprise members that are randomly sampled (or pseudo-randomly sampled) from the set $y_1$, $y_2$, $y_3$, and $y_4$ of each user. For example, the shuffled set of modified queries $y_5$ may comprise a first query sampled from $y_2$ (e.g., from Bob), a second query sampled from $y_3$ (e.g., from Alice), a third query sampled from $y_4$ (e.g., from David), a fourth query sampled from $y_2$ (e.g., another query from Bob), and so on, until the total number of sampled queries included in the sets of modified queries $y_5$, $y_6$, $y_7$, and $y_8$ is equal to (or greater than) a threshold number of queries. The shuffled sets of modified queries $y_5$, $y_6$, $y_7$, and $y_8$ may be sent to a remote computing device (e.g., to a computing device of curator 406). The shuffler 404 de-links the data by masking the data's source and confounding its provenance. Additionally, shuffling maintains the underlying statistics of the dataset as no queries are excluded from the dataset (as in other techniques such as sub-sampling).

Definition 0.8 (Amplification by shuffling). For a domain $\mathcal{D}$, let $\mathcal{R}^{(i)}$: $\mathcal{W}^1 \times \ldots \times W^{(i-1)} \times \mathcal{D} \to W^i$ for $i \in [n]$ be a sequence of $\varepsilon_0$-DP algorithms. Lets $\mathcal{S}$:W*→W* be an algorithm that samples a uniform permutation π over [n]. Then algorithm $\mathcal{S}$ satisfies ($\varepsilon$, δ)-DP where $$\varepsilon = O\left(\frac{\varepsilon_0 \sqrt{\log(1/\delta)}}{\sqrt{n}}\right)$$

Example pseudo-code is depicted below for both randomized modification of natural language inputs (e.g., algorithm 1) and amplification of the effects of randomization by shuffling (e.g., algorithm 2).

| Algorithm 1: Randomization | Algorithm 2: Amplification by shuffling |
|---|---|
| Input: word w ∈ W, parameters m, for each n users<br>Output: word ŵ ∈ W<br>for i ∈ {1, . . . , m} do<br>    Noise η ~ Lap($\Delta_s$/ε) from smooth sensitivity $\hat{\phi} = \phi$ (w) + η | Input: Multiset $\{\hat{w}_i\}_{i \in [n]}$, outputs of local randomizers<br>Output: Multiset $\{\tilde{w}_i\}_{i \in [n]}$, uniform permutes of [n]<br>for i ∈ {n − 1, . . . , 1} do<br>    j ← random integer such that 0 ≤ j ≤ i exchange $w_i$ and $w_j$ |
| release ŵ = argmin$_{u \in W}$ ‖ ϕ(u) − ($\hat{\phi}$) ‖ | relrease {w} |

Figure 5:
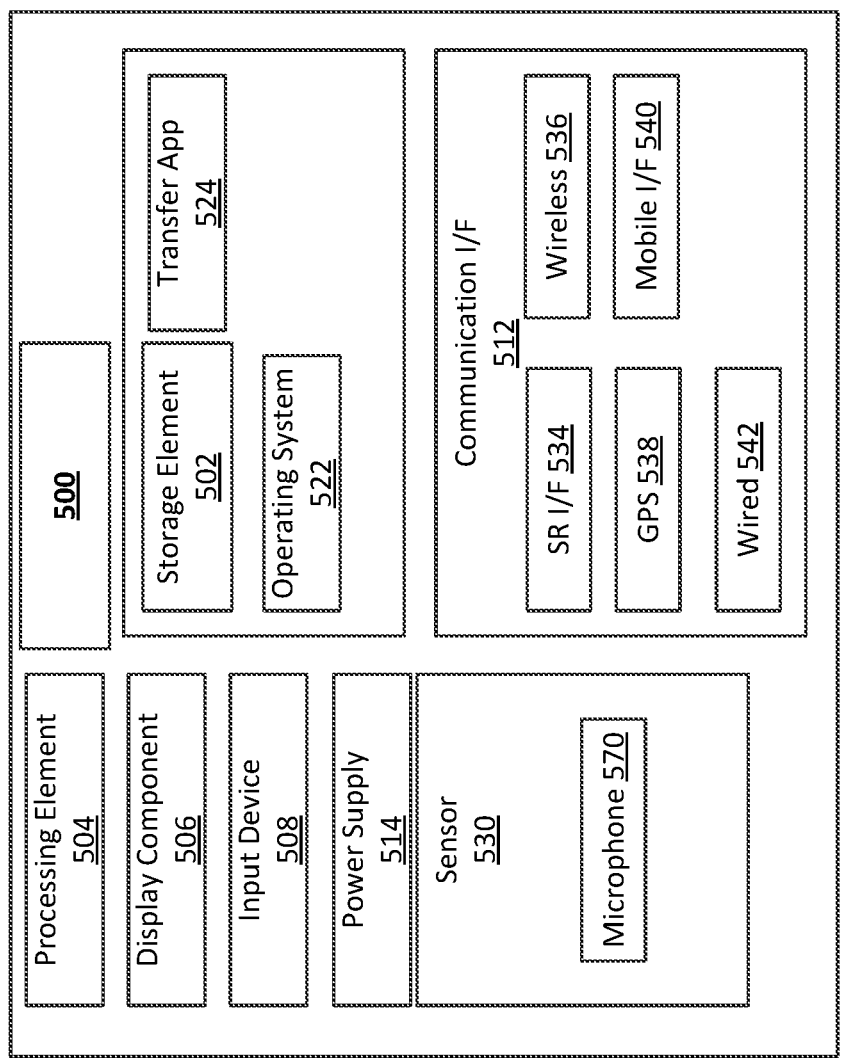
FIG. 5 is a block diagram showing an example architecture of a computing device that may be used to modify a natural language input, in accordance with various embodiments described herein.

FIG. 5 is a block diagram showing an example architecture 500 of a computing device that may be configured to modify a natural language input using calibrated noise, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable memory devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store machine learned models, parameters thereof, and/or data representations of the base dataset (e.g., the corpus of data points in embedding space 140) described herein..

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor and/or microphone 570 included in the architecture 500.

When implemented in some user devices, the architecture 500 may also comprise a display component 506 and/or be configured in communication with one or more external display components 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone or an array of microphones for capturing sounds, such as voice requests and/or natural language inputs.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. As noted above, multiple devices may be employed in a single system. In such a multi-device system, each of the devices may include different components for performing different aspects of the system's processing. The multiple devices may include overlapping components. The components of the natural language processing system, as described herein, are exemplary, and may be located as a stand-alone device or may be included, in whole or in part, as a component of a larger device or system.

Figure 6:
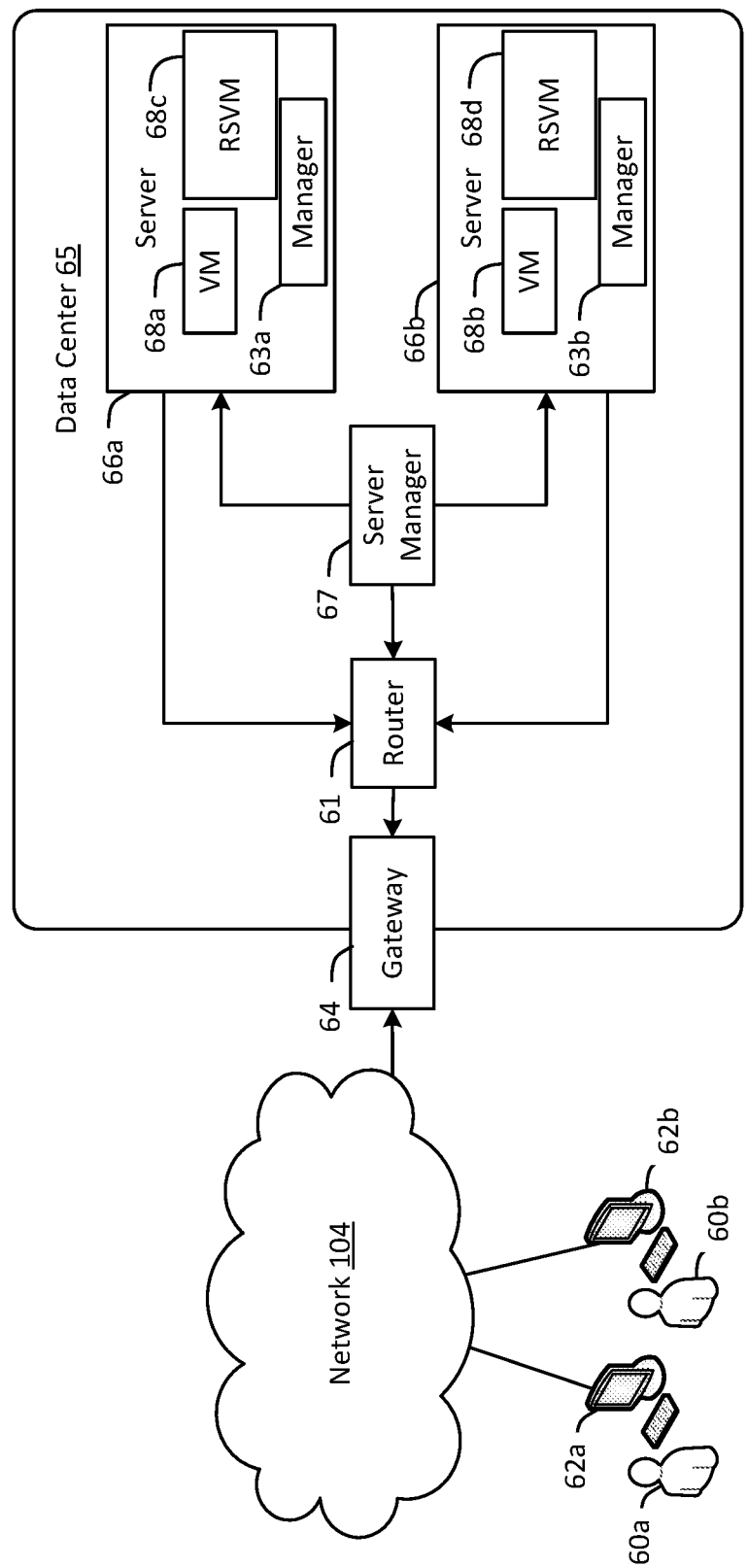
FIG. 6 is a diagram illustrating an example system for sending and providing data that may be used in accordance with the present disclosure.

An example system for sending and providing data and processing data of natural language processing systems will now be described in detail. In particular, FIG. 6 illustrates an example computing environment in which the embodiments described herein may be implemented. For example, the computing environment of FIG. 6 may be configured to provide natural language processing as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute one or more of the various natural language processing and/or meaning representation data modification techniques described herein.

These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices, and the like.

Each type or configuration of computing resource may be available in different sizes, such as large resources—consisting of many processors, large amounts of memory and/or large storage capacity—and small resources—consisting of fewer processors, smaller amounts of memory, and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box, or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and may, alone or in combination, manage communications within networks in data center 65, for example, by forwarding packets or other data communications as appropriate based on characteristics of such communications (e.g., header information including source and/or destination addresses, protocol identifiers, size, processing requirements, etc.), and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66*a* and 66*b*. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated, and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, configured to implement and distribute the infrastructure, and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, JavaT™ virtual machines (JVMs), general-purpose or special-purpose operating systems, platforms that support various interpreted or compiled programming languages such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7:
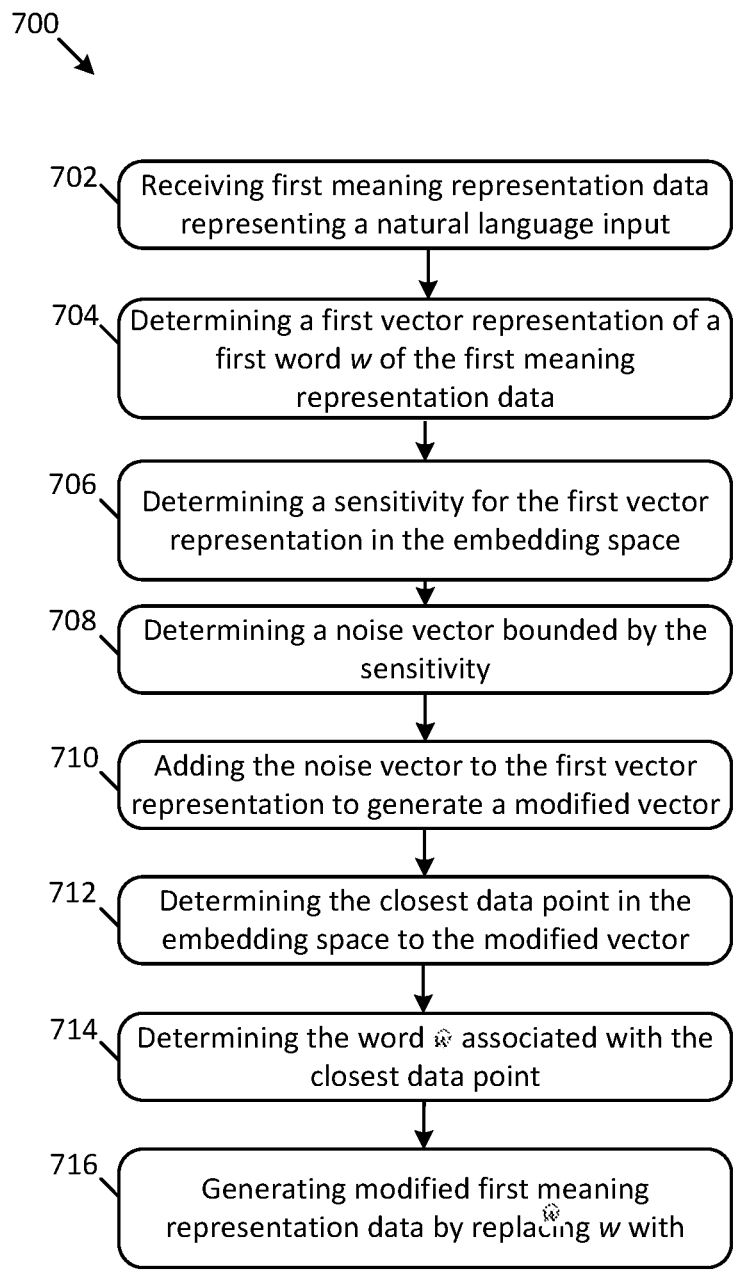
FIG. 7 depicts an example process that may be used to modify a natural language input, according to various aspects of the present disclosure.

FIG. 7 depicts a flow chart showing an example process 700 for modifying natural language data, according to various aspects of the present disclosure. Those portions of FIG. 7 that have been previously discussed in reference to FIGS. 1-6 may not be described again for purposes of clarity and brevity. The actions of the process 700 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 700 of FIG. 7 may begin at action 702, at which first meaning representation data representing a natural language input may be received. The first meaning representation datamay be output by an ASR component and/or may be received as input text data or other meaning representation data. The natural language input may comprise one or more words. Process 700 may continue from action 702 to action 704, at which a first vector representation of a first word w of the first meaning representation data may be determined. The vector representation may be determined using, for example, one or more feature extraction layers of a machine learning model and/or using a mathematical operation used to generate an embedding vector representing a semantic interpretation of a word.

Process 700 of FIG. 7 may continue from action 704 to action 706, at which a sensitivity for the first vector representation in the embedding space may be determined. In some examples, the local sensitivity may be determined based on the closest k neighbors to the vector representation of the first word w in the embedding space. For example, equation (4) may be used to determine the local sensitivity. Additionally, a parameter β may be used to smooth local sensitivity using equation (3).

Processing may continue from action 706 to action 708, at which a noise vector bounded by the sensitivity may be determined. In various examples, a noise vector N which may be of the same dimensionality of the embedding space 140 may be determined using the Laplace mechanism (e.g., by sampling the noise vector N from a Laplace distribution, wherein the sampled noise is bounded by the smooth local sensitivity determined for the current word).

Processing may continue from action 708 to action 710, at which the noise vector N may be added to the first vector representation of the first word to generated a modified vector. At action 710, the noise N sampled from the Laplace distribution and bounded by the smooth local sensitivity may be added to the vector representation of the first word to generate a modified vector (sometimes referred to as a "perturbed" vector).

Processing may continue from action 710 to action 712, at which the closest data point (e.g., the closest neighboring word representation vector) to the modified vector in the embedding space may be determined. At action 714, the word $\hat{w}$ associated with the closest data point may be determined. Processing may continue from action 714 to action 716, at which modified first meaning representation data may be generated by replacing the first word w with the word $\hat{w}$.

Figure 8:
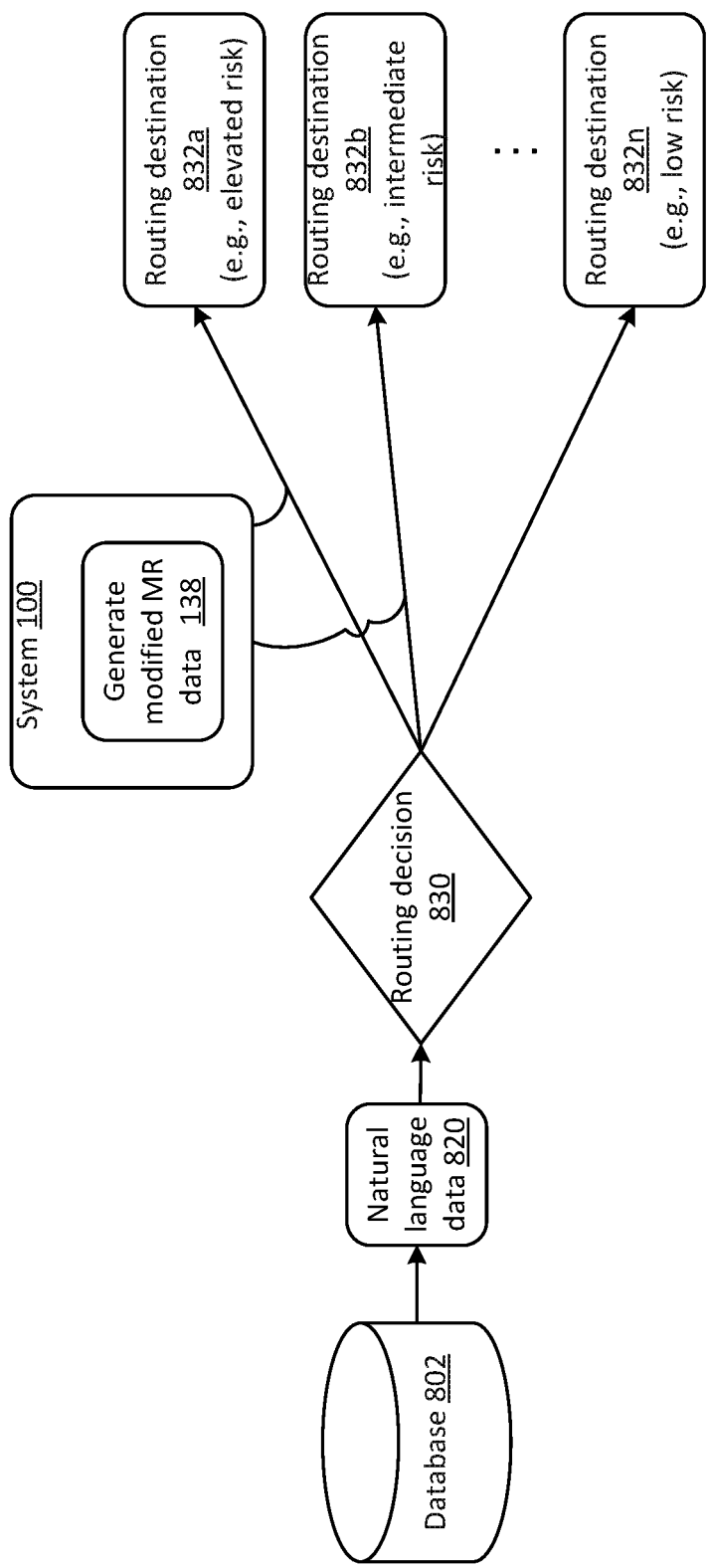
FIG. 8 is a block diagram illustrating an example in which natural language data may be modified prior to taking an action on the natural language data, in accordance with various embodiments of the present disclosure.

FIG. 8 is a block diagram illustrating an example in which natural language data may be modified prior to taking an action on the natural language data, in accordance with various embodiments of the present disclosure.

Figure 9:
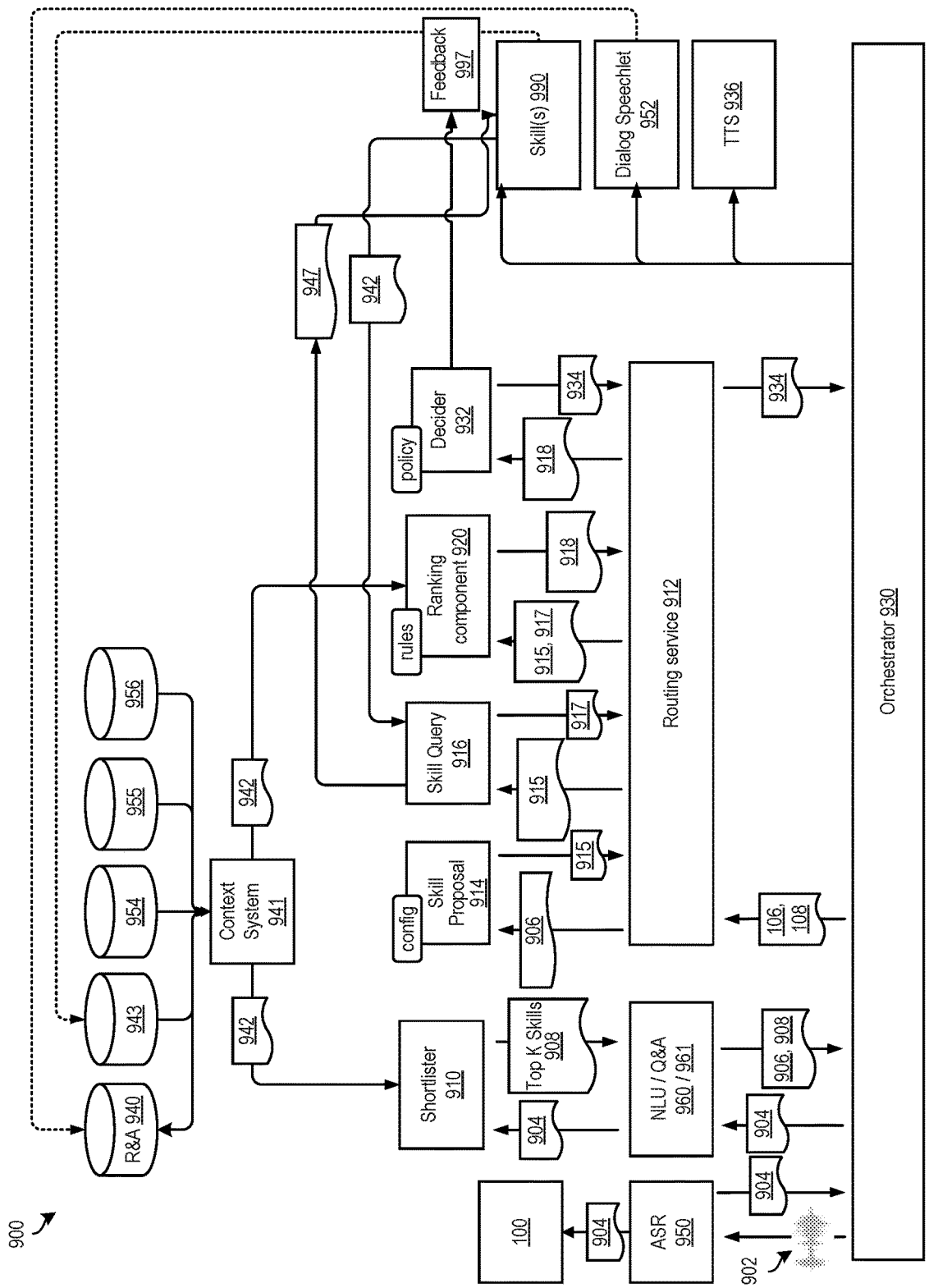
FIG. 9 is a block diagram illustrating an example natural language processing system that may be used according to various embodiments of the present disclosure.

In various examples, natural language data (e.g., natural language data 820 which may be a natural language input to a speech processing and/or a natural language processing system) may be stored in a database 802. Database 802 may be, for example, feedback storage 943 (FIG. 9). In such a case, the natural language data 820 may be user feedback concerning a particular user experience and/or interaction with the natural language processing system 900 and/or a skill 990. In another example, database 802 may be skill data 956 (e.g., natural language data received from a user in association with the operation of a particular skill 990). In other examples, the natural language data 820 may be intent data, context data, etc., stored in various components described below in reference to FIG. 9.

As previously described, system 100 may be used to modify one or more words of the natural language data 820. In various examples, system 100 may modify the natural language data 820 based on an action to be taken with respect to the natural language data 820.

For example, if the natural language data 820 is to be sent to a remote computing device that is controlled by a third party the text of natural language data 820 may be modified in order to preserve privacy and/or in order to avoid divulging sensitive information. In another example, if the natural language data 820 is to be stored in a persistent memory the language may be modified in order to preserve anonymity and/or privacy. In some further examples, a determination that natural language data 820 is to be used for a particular purpose (e.g., for advertising, for metadata describing an account, etc.) may cause system 100 to modify the meaning representation prior to use of the natural language data 820.

In the example depicted in FIG. 8, if the natural language data 820 is selected to be sent to a routing destination that is associated with an elevated risk, the natural language data 820 may be modified using system 100 prior to sending in order to mitigate risk. In another example, natural language data 820 may be routed to routing destination 832*b* that is of lower risk relative to routing destination 832*a*. In the example, the modification may be adjusted (e.g., using the parameters ε and/or β in order to affect the degree of modification) relative to the modification for sending the natural language data 820 to elevated risk routing destination 832a. In another example, natural language data 820 may be routed to routing destination 832n associated with low risk. In such an example, no modification may be made to the meaning representation data (e.g., text data) by system 100 and/or the amount of modification may be reduced accordingly.

In general, system 100 may be used to modify natural language data. In some examples, natural language data that is deemed to be of a sensitive nature may be modified prior to storage and/or sending the data to a remote computing device. In some examples, modification may be performed based on the destination to which the natural language data is to be sent (as described above).

FIG. 9 is a block diagram illustrating an example natural language processing system 900, according to various embodiments of the present disclosure. The various components illustrated FIG. 9 may be located on the same or different physical devices. Communication between various components illustrated in FIG. 9 may occur directly or across a network. A speech processing-enabled device may capture audio using an audio capture component, such as one or more microphone(s). The speech processing enabled device may send audio data 902 (e.g., corresponding to an utterance) to an orchestrator 930 of the natural language processing system 900. The speech processing enabled device may also send metadata (e.g., including device identifiers, device type data, contextual data, IP address data, room location data, etc.) to the orchestrator 930. The components depicted in FIG. 9, including components of a natural language processing system may be generally referred to as spoken language processing components, a natural language processing system 900 a spoken language processing system, speech processing components, and/or a speech processing routing system. Additionally, in various examples, the components depicted in FIG. 9 may process written input (e.g., text data) in addition to spoken input.

Upon receipt by the natural language processing system 900, the audio data 902 may be sent to an orchestrator 930. The orchestrator 930 may include memory and logic that enables the orchestrator 930 to initiate a dialog session and to transmit various pieces and forms of data to various components of the system, as described in further detail below.

The orchestrator 930 may send the audio data 902 to an ASR component 950 (e.g., a speech recognition component). The ASR component 950 may transcribe the audio data 902 into one or more hypotheses representing speech contained in the audio data 902. The ASR component 950 interprets the speech in the audio data based on a similarity between the characteristics of the audio data corresponding to the speech and pre-established language models. For example, the ASR component 950 may compare the audio data 902 with models for sounds (e.g., subword units such as phonemes) and sequences of sounds to identify words that match the sequence of sounds in the speech represented in the audio data 902. The ASR component 950 may send text data 904 (although in other examples data 904 may be non-textual meaning representation data) generated thereby to orchestrator 930 that may, in turn, send the text data 904 to NLU component 960 and/or question and answer component 961. Optionally, the text data 904 may also be sent to system 100 to modify one or more words of the text data 904 either prior to sending to NLU component 960 or in a separate processing path. As previously described, the text data 904 may include one or more ASR hypotheses. The text data 904 may include a top scoring hypothesis of the speech represented in the audio data 902 or may include an N-best list including a group of hypotheses of the speech represented in the audio data 902, and potentially respective ASR processing confidence scores. As previously described, in some other examples, the ASR component 950 (and/or other components of the natural language processing system 900) may generate other metadata associated with the utterance such as an overall utterance confidence score, per-word (e.g., per token) confidence scores for the utterance, utterance duration, stream duration (e.g., duration of the stream of audio data from speech processing enabled device to natural language processing system 900), a number of tokens output by ASR, etc.

The NLU component 960 attempts to make a semantic interpretation of the phrases or statements represented in the text data input therein. That is, the NLU component 960 determines one or more meanings associated with the phrases or statements represented in the text data 904 based on individual words represented in the text data 904. The NLU component 960 interprets a text string to derive an intent of the user (e.g., an action that the user desires be performed) as well as pertinent pieces of information in the text data that allow a device (e.g., the speech processing enabled device, the natural language processing system 900, a computing device(s) implementing a skill, etc.) to complete the intent. For example, if the text data 904 corresponds to "Set temperature to 74 degrees," the NLU component 960 may determine the user intended to invoke a climate intent with a target temperature value slot of 74 degrees Fahrenheit. As previously described, in addition to the NLU intent and slot data, the NLU component 960 may generate other metadata associated with the utterance (e.g., with the audio data 902). Examples of such metadata include, an NLU confidence score for the top intent hypothesis, NLU classification type (e.g., statistical vs. deterministic), NLU slot presence (e.g., data indicating that a particular slot was present), NLU confidence score for the overall top hypothesis (e.g., including the relevant skill, intent, and/or slot), entity recognition confidence scores, entity recognition match types (e.g., exact match, prefix match, suffix match, etc.), etc. Herein, the data output by the NLU component 960 (depicted in FIG. 9 as "NLU 960") is referred to as NLU output data 906.

In some examples, text data 904 may be sent to a question and answer (Q&A) component 961 that may use one or more knowledge bases and/or knowledge graphs to answer a question represented in the text data 904. In at least some examples, the question and answer component 961 may determine an answer to the question in parallel with processing of the text data 904 by NLU component 960. In various examples, the question and answer component 961 may be configured to output structured data (e.g., a meaning representation) representing an answer to a question present in the text data 904. For example, the answer to a question may comprise triple data including a subject, object, and predicate, as described herein. However, in some examples, the meaning representation may be other structured data, apart from triple data, as known to those skilled in the art.

NLU component 960 may send the text data 904 and/or some of NLU output data 906 (such as intents, recognized entity names, slot values, etc.) to a shortlister 910. The shortlister 910 may comprise one or more machine learning models that may be effective to predict a subset of skills that are most likely to be able to correctly process the input data, based on the input of the text data 904 and/or the NLU output data 906. In addition, the shortlister 910 may call the ranking and arbitration component 940 to request features pre-computed by the ranking and arbitration component 940 according to features used as inputs by the machine learning models of shortlister 910. As previously described, the shortlister 910 may define source data used to compute the features and/or may specify functions used to generate the features from the source data (e.g., formulae and/or functions) prior to runtime processing of input data. The ranking and arbitration component 940 may precompute the features according to the specified feature definitions supplied by shortlister 910 and by the other components of natural language processing system 900 and may store the precomputed features in memory. Ranking and arbitration component 940 may generate indexes that may be used to retrieve the precomputed features during runtime (e.g., through an API). Accordingly, during runtime processing, shortlister 910 may retrieve the precomputed features from ranking and arbitration component 940 and may use the precomputed features (among other inputs) to predict a subset of skills that are most likely to be appropriate to process the current input data. In some examples, in addition to predicting a subset of skills, shortlister 910 may predict whether or not question and answer service 961 is likely to generate an appropriate response to the current input data. Accordingly, shortlister 910 may send the top K skills 908 to NLU component 960. NLU component 960 may thereafter perform skill-specific NLU processing (and/or question-and-answer processing by question and answer component 961) for the skills in the top K skills 908 to determine skill-specific intents, slots, and/or named entities. NLU output data 906 may include such skill-specific data (e.g., skill-specific N-best hypotheses).

Ranking and arbitration component 940 may communicate with various systems in order to obtain source data used to precompute features. For example, ranking and arbitration component 940 may communicate with feedback storage 943 to receive user feedback data (e.g., explicit and/or implicit user feedback related to user satisfaction with processing of input data). In various examples, the user feedback data may be user-specific and/or device specific and may indicate whether a user was satisfied or not satisfied with a particular interaction with natural language processing system 900. As previously discussed, in various examples user feedback data may be predicted for input data prior to processing the input data using a skill 990. In various examples, user feedback data may be used to pre-compute various features used by machine learning models of natural language processing system 900. Accordingly, in some examples, the skills selected for processing particular input data may be determined based at least in part on skills that a user (or a group of similar users) has responded positively to in the past.

Additionally, ranking and arbitration component 940 may communicate with endpoint context system 954, which may provide context data at the conclusion of a user interaction with the natural language processing system 900. In another example, ranking and arbitration component 940 may communicate with skill data 956 to determine information from the skill regarding past interactions with the skill and/or data acquired by the skill. Additionally, ranking and arbitration component 940 may communicate with other data sources 955, as new services are added and/or as new data types that may be useful for routing prediction are made available. In addition to ranking and arbitration component 940 using context data 942 to precompute features used by various machine learning models of the routing architecture of the natural language processing system 900, a context system 941 may receive the context data 942. The context system 941 may provide the context data directly to both ranking and arbitration component 940 as well as to various components of the routing architecture of natural language processing system 900. For example, the context system 941 may send context data 942 to shortlister 910 and/or ranking component 920 in order to determine a shortlist of skills 990 for particular input data and/or in order to rank the shortlisted skills.

NLU output data 906 (which may, in some examples, include question and answer output data) and top K skills 908 may be sent by NLU component 960 to orchestrator 930. Orchestrator 930 may send the top K skills 908 and the NLU output data 906 to routing service 912. Routing service 912 may send the top K skills 908 and NLU output data 906 to skill proposal component 914. Skills 990 may subscribe to particular intents using skill proposal component 914. Accordingly, skill proposal component 914 may receive the NLU output data 906 and may determine whether any of the included intents correspond to one or more of skills 990. If so, skill proposal component 914 may generate candidate data comprising <Intent, Skill> candidate pairs 915. The candidate pairs 915 may be sent to routing service 912 and may be sent by routing service 912 to skill query service 916. Skill query service 916 comprises an API through which skills 990 may "opt out" of particular requests. For example, a skill 990 may comprise a video playback skill. Accordingly, the skill 990 may register with skill query service 916 to indicate that only requests made on a device with a display screen should be routed to the particular skill 990. In addition, skills 990 may communicate availability information, pricing information, and/or other structured descriptions of how and under what circumstances (e.g., determined using context data) the skill 990 can fulfill a request represented by the current input data. Skill query service 916 may send a signal 917 indicating what skills can fulfill a particular request (and/or what skills are unable to fulfill the request). The signal 917 may be sent to routing service 912. Routing service 912 may send the signal 917 along with the candidate pairs 915 to a ranking component 920. Skills 990 may send context data 942 to skill query service 916 to indicate situations in which a skill may opt out of processing a particular request (e.g., if the device sending the input data does not include a display screen, etc.). In various examples, the context data 942 sent by skills 990 to skill query service 916 may be skill and/or request specific context data. Additionally, skill query service 916 may send intent requests 947 to skills 990.

Ranking component 920 may include one or more statistical machine learning models effective to rank the candidates included in candidate pairs 915. In order to rank the candidate pairs 915, ranking component 920 may generate confidence scores for each corresponding candidate pairs 915. A confidence score may indicate that the corresponding skill 990 and/or intent of the candidate pair is appropriate to process the request. Ranking component 920 may compute features using the candidate pairs 915 and signal 917 in order to predict the ranking of the skills 990 included in the candidate pairs 915. The features computing during processing of the input data (sometimes referred to as "runtime features") may comprise a feature representation of the list of candidate pairs 915 and/or a representation of the signal 917. Additionally, ranking component 920 may query ranking and arbitration component 940 for precomputed features that have been defined for use by ranking component 920. As previously described, the precomputed features may be determined based on contextual data, user feedback data, past usage data, skill data, previous rankings of ranking component 920, etc. Additionally, ranking component 920 may compute runtime features using context data 942, user feedback data from feedback storage 943, and/or other data sources. In various examples, the loss function for the machine learning models of ranking component 920 may optimize based on user satisfaction scores computed using user feedback data from feedback storage 943.

Ranking component 920 may generate a ranked list 918 of the candidate skills indicated in candidate pairs 915. In at least some examples, the ranking component 920 may use a deep neural network as a machine learning model for determining the ranked list 918. In some examples, ranking component 920 (and/or some other natural language processing system 900 component, such as decider engine 932) may determine plan data that may override the ranked list 918 such that a lower ranked skill among the candidate pairs 915 may be selected for processing the input data. In various examples, the confidence scores for skill-specific interpretations output by reinforcement learning model 979 may be used by ranking component 920 to generate the ranked list. As such, candidate pairs that include skill-specific NLU interpretations with high confidence scores (from reinforcement learning model 979) may be more highly ranked by ranking component 920, in some examples.

In another example, the decider engine 932 may store policies that may control whether or not explicit user feedback is solicited (e.g., via TTS) after the completion of an action (e.g., by the top-ranked skill determined by the ranker component). In another example, decider engine 932 may control feedback component 997 to request explicit feedback from a user post-skill processing (e.g., via TTS). In various examples, feedback component 997 may ask the user whether or not the user was satisfied with the action taken by the natural language processing system 900. In yet another example, an exploration policy defining a dynamic routing adjustment may send input data that matches predicate data defined using the dynamic routing adjustment component to a newly-implemented skill 990. The decider engine 932 may determine that the top ranked result from the ranking component 920 should be ignored due to the dynamic routing adjustment being performed by the dynamic routing adjustment component. Additionally, in some examples, a policy of the decider engine 932 may be to solicit explicit feedback from the user whenever a new skill is routed to due to a dynamic routing adjustment. Accordingly, at the completion of the action, the decider engine 932 may control TTS to inquire as to whether the user was satisfied with the interaction with the new skill and/or whether the performed action was the action intended by the user.

Decider engine 932 may output plan data that comprises a routing plan 934 for processing the input data. The routing plan 934 may define a target skill 990 (and/or may identify that question and answer component 961) to process the input data. As described above, the target skill 990 may be selected as the top-ranked hypothesis determined by the ranking component 920. In some other examples, the decider engine 932 may select a target skill 990 based on a policy, as described above. In some examples, the ranking component 920 may determine that two different skills are equally applicable for processing the input data. In such examples, the decider engine 932 may determine that disambiguation should occur. Accordingly, the routing plan 934 may include sending the input data to a dialog speechlet 952 that may output (via TTS) one or more questions (e.g., a disambiguation request) used to prompt the user to disambiguate between the two equally likely (or approximately equally likely) interpretations of the input data. For example, it may be unclear, based on a user's request, whether the user intended to invoke a movie playback skill or a music playback skill, as a movie and a soundtrack for the movie may be identified using the same name. Accordingly, the decider engine 932 may determine that the top two hypotheses of ranking component 920 are equally likely (or approximately equally likely) and may determine that a question should be asked to disambiguate between the two possible actions. Accordingly, the routing plan 934 may route the input data to the dialog speechlet 952, and the dialog speechlet 952 may inquire whether the user intended to play the movie or the soundtrack.

In another example, the decider engine 932 may determine that the user was not satisfied with the top hypothesis of the ranking component 920 (e.g., due to explicit or implicit feedback received from the user in response to taking an action associated with the top ranking component 920 hypothesis). Accordingly, the decider engine 932 may determine that the routing plan 934 should be to determine the second highest ranked hypothesis of the ranking component 920. The routing plan 934 may be sent to the fallback engine 936. In various examples, the fallback engine 936 may determine a list of the top hypotheses, top intents, and/or top ASR text interpretations from the previous turn of dialog, and may select a fallback option for processing the input data from the lists.

If a skill 990 outputs natural language text in response to processing, the orchestrator may send the text to TTS component 936 for output as audio representing the speech. Conversely, if the skill 990 (and/or the question and answer component 961) outputs a structured data representation (e.g., a meaning representation such as triple data) representing the response to the current input data, natural language output text representing the structured data may be generated. TTS component 936 may thereafter output audio representing the natural language output text.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
    identifying first text data representing a natural language input, wherein the first text data is included in a training data set for a first natural language machine learning model;
    determining a first word of the first text data for input into a randomization function R;
    determining a first vector representation of the first word in an embedding space, the embedding space comprising representations of a plurality of words;
    determining a first average distance between the first vector representation of the first word and a first plurality of vector representations of k closest words to the first vector representation in the embedding space;
    determining a first local sensitivity of the randomization function R that limits a magnitude of modification of the first vector representation, wherein the first local sensitivity is determined using the first average distance;
    determining a first noise vector N by sampling from a Laplace distribution, wherein the first noise vector N is limited by the first local sensitivity;
    generating a second vector representation by adding the first noise vector N to the first vector representation of the first word;
    determining a third vector representation among the first plurality of vector representations that is closest to the second vector representation in the embedding space;
    determining a second word associated with the third vector representation;
    generating, by a first computing device, second text data by replacing the first word of the first text data with the second word
    sending the second text data to a remote computing device;
    receiving, by the first computing device from the remote computing device, first data comprising the second text data and a class label; and
    updating at least one parameter of the first natural language machine learning model using the first data.

2. The method of claim 1, further comprising:
    determining a third word of the first text data for input into the randomization function R;
    determining a vector representation of the third word in the embedding space;
    determining a second average distance between the vector representation of the third word and a second plurality of vector representations of k closest words to the vector representation of the third word in the embedding space, wherein the second average distance is greater than the first average distance;
    determining a second local sensitivity of the randomization function R that limits a second magnitude of modification of the vector representation of the third word, wherein the second local sensitivity is determined using the second average distance, wherein the second local sensitivity is greater than the first local sensitivity;
    determining a second noise vector N by sampling from the Laplace distribution, wherein the second noise vector N is limited by the second local sensitivity, wherein a magnitude of the second noise vector N is greater than a magnitude of the first noise vector N; and
    using the second noise vector N to determine a fourth word to replace the third word of the first text data.

3. The method of claim 1, further comprising:
    receiving a selection of a number, the number representing a threshold number of queries;
    receiving, from a second computing device, a first set of queries, wherein the second text data corresponds to a first query of the first set of queries;
    receiving, from the second computing device, a second set of queries;
    determining that a total number of queries in the first set of queries and the second set of queries is greater than or equal to the threshold number of queries;
    generating a third set of queries by at least one of randomly sampling queries or pseudo-randomly sampling queries from at least the first set of queries and the second set of queries; and
    sending the third set of queries to the remote computing device.

4. A method comprising:
    determining, by at least one first computing device, a first vector representation of a first word of first data, the first data representing a natural language input for natural language processing;
    determining second data for the first vector representation based at least in part on a first average distance from the first vector representation to a first plurality of vector representations of k words in an embedding space, wherein the second data controls an amount of noise used to modify the first vector representation;
    determining a first noise vector based at least in part on the second data;
    generating a first modified vector representation using the first noise vector and the first vector representation;
    determining a second word based at least in part on the first modified vector representation;
    generating modified first data by replacing the first word with the second word in the first data; and updating, using the modified first data, at least one parameter value of a first natural language processing machine learning model.

5. The method of claim 4, further comprising:
receiving a first set of natural language input data from a first source device, the first set of natural language input data comprising the modified first data;
receiving a second set of natural language input data from a second source device; and
generating a third set of natural language input data comprising at least some data from the first source device and at least some data from the second source device.

6. The method of claim 4, further comprising:
determining a second distance from the first vector representation to a third vector representation of a third word in the embedding space, wherein the second data is based at least in part on the second distance; and
determining the second word based at least in part on the second data.

7. The method of claim 4, further comprising:
determining a routing destination for the first data;
determining that the first data is modified prior to sending the first data to the routing destination; and
generating the modified first data by replacing the first word with the second word in the first data based at least in part on the determination that the first data is modified prior to sending the first data to the routing destination.

8. The method of claim 4, further comprising determining the first noise vector by sampling from an n-dimensional Laplace distribution, wherein a magnitude of the first noise vector is controlled by a magnitude parameter ε.

9. The method of claim 4, further comprising:
receiving, by the at least one first computing device, a first utterance representing the natural language input;
generating, by the at least one first computing device, the first data representing the natural language input using automatic speech recognition;
generating, by the at least one first computing device, the modified first data; and
sending, by the at least one first computing device, the modified first data to a remote computing device.

10. The method of claim 4, further comprising:
determining a third vector representation of a third word of the first data;
determining third data for a second vector representation representing a different word based at least in part on a second distance from the second vector representation to the third vector representation in the embedding space, wherein the second distance is greater than the first average distance;
determining a second noise vector based at least in part on the third data, wherein a magnitude of the second noise vector is greater than a magnitude of the first noise vector based at least in part on the second distance being greater than the first average distance;
generating a second modified vector representation using the second noise vector and the second vector representation;
determining a fourth word based at least in part on the second modified vector representation; and
generating the modified first data further by replacing the third word with the fourth word.

11. The method of claim 4, further comprising determining the first noise vector by sampling a Laplace distribution, wherein a first magnitude of the first noise vector is proportional to at least one second magnitude associated with a value of the second data.

12. The method of claim 4, further comprising:
determining a closest vector representation to the first modified vector representation in the embedding space;
determining that the second word is associated with the closest vector representation; and
selecting the second word for the modified first data.

13. A system comprising:
at least one processor; and
at least one non-transitory computer-readable memory storing instructions that, when executed by the at least one processor, program the at least one processor to:
determine a first vector representation of a first word of first data, the first data representing a natural language input for natural language processing;
determine second data for the first vector representation based at least in part on a first average distance from the first vector representation to a first plurality of vector representations of k words in an embedding space, wherein the second data controls an amount of noise used to modify the first vector representation;
determine a first noise vector based at least in part on the second data;
generate a first modified vector representation using the first noise vector and the first vector representation;
determine a second word based at least in part on the first modified vector representation;
generate modified first data by replacing the first word with the second word in the first data; and
update, using the modified first data, at least one parameter value of a first natural language processing machine learning model.

14. The system of claim 13, the at least one non-transitory computer-readable memory storing further instructions that, when executed by the at least one processor, are further effective to program the at least one processor to:
receive a first set of natural language input data from a first source device, the first set of natural language input data comprising the modified first data;
receive a second set of natural language input data from a second source device; and
generate a third set of natural language input data comprising at least some data from the first source device and at least some data from the second source device.

15. The system of claim 13, the at least one non-transitory computer-readable memory storing further instructions that, when executed by the at least one processor, are further effective to program the at least one processor to:
determine a second distance from the first vector representation to a third vector representation of a third word in the embedding space, wherein the second data is based at least in part on the second distance; and
determine the second word based at least in part on the second data.

16. The system of claim 13, the at least one non-transitory computer-readable memory storing further instructions that, when executed by the at least one processor, are further effective to program the at least one processor to:
determine a routing destination for the first data;
determine that the first data is modified prior to sending the first data to the routing destination; and
generate the modified first data by replacing the first word with the second word in the first data based at least in part on the determination that the first data is modified prior to sending the first data to the routing destination.

17. The system of claim 13, the at least one non-transitory computer-readable memory storing further instructions that, when executed by the at least one processor, are further effective to program the at least one processor to determine the first noise vector by sampling from an n-dimensional Laplace distribution, wherein a magnitude of the first noise vector is controlled by a magnitude parameter $\varepsilon$.

18. The system of claim 13, the at least one non-transitory computer-readable memory storing further instructions that, when executed by the at least one processor, are further effective to program the at least one processor to:
- receive, by a first computing device, a first utterance representing the natural language input;
- generate, by the first computing device, the first data representing the natural language input using automatic speech recognition;
- generate, by the first computing device, the modified first data; and
- send, by the first computing device, the modified first data to a remote computing device.

19. The system of claim 13, the at least one non-transitory computer-readable memory storing further instructions that, when executed by the at least one processor, are further effective to program the at least one processor to:
- determine a third vector representation of a third word of the first data;
- determine third data for a second vector representation representing a different word based at least in part on a second distance from the second vector representation to the third vector representation in the embedding space, wherein the second distance is greater than the first average distance;
- determine a second noise vector based at least in part on the third data, wherein a magnitude of the second noise vector is greater than a magnitude of the first noise vector based at least in part on the second distance being greater than the first average distance;
- generate a second modified vector representation using the second noise vector and the second vector representation;
- determine a fourth word based at least in part on the second modified vector representation; and
- generate the modified first data further by replacing the third word with the fourth word.

20. The system of claim 13, the at least one non-transitory computer-readable memory storing further instructions that, when executed by the at least one processor, are further effective to program the at least one processor to determine the first noise vector by sampling a Laplace distribution, wherein a first magnitude of the first noise vector is proportional to at least one second magnitude associated with a value of the second data.

* * * * *